United States Patent [19]

Siddio et al.

[11] Patent Number: 5,012,377
[45] Date of Patent: Apr. 30, 1991

[54] HOMOGENEOUS MAGNETIC HEAD CLEANING MATERIAL

[75] Inventors: Mohammed Siddio; I-Huan Lo, both of San Jose, Calif.

[73] Assignee: Tandy Corporation, Fort Worth, Tex.

[21] Appl. No.: 453,148

[22] Filed: Dec. 15, 1989

Related U.S. Application Data

[63] Continuation of Ser. No. 182,829, Apr. 18, 1988, abandoned.

[51] Int. Cl.⁵ .............................................. G11B 5/41
[52] U.S. Cl. ............................. 360/128; 15/DIG. 12
[58] Field of Search ..................... 360/128, 132, 137; 15/DIG. 12-13

[56] References Cited

U.S. PATENT DOCUMENTS

| | | |
|---|---|---|
| 3,978,520 | 8/1976 | Nowicki et al. |
| 4,635,154 | 1/1987 | Allsop ............................ 360/128 |
| 4,661,874 | 4/1987 | Beuhl. |
| 4,724,484 | 2/1988 | Ward. |

FOREIGN PATENT DOCUMENTS

| | | |
|---|---|---|
| 0056720 | 7/1982 | European Pat. Off. |
| 0182449 | 5/1986 | European Pat. Off. |
| 54-43703 | 6/1979 | Japan ............................ 360/128 |
| 1553550 | 9/1976 | United Kingdom. |
| 1482410 | 8/1977 | United Kingdom. |
| 2127203 | 4/1984 | United Kingdom. |
| 2152268A | 7/1985 | United Kingdom. |

OTHER PUBLICATIONS

DISCWASHER Brochure, Received 1988, Discwasher, Schliller Park, Ill.
Memorex, SAFEGUARD SYSTEM Brand video head cleaner brochure, copyright 1986 Memtek Products.
Cleaner Heads for Everbody brochure, Copyright 1988, Memtek.
3M flyer, #84-9811-1901-3(1720)TP, copyright 1986.
3M flyer, #84-9811-1900-5(126.5)TP, 1986.

*Primary Examiner*—A. J. Heinz
*Attorney, Agent, or Firm*—Townsend and Townsend

[57] ABSTRACT

A magnetic head cleaner (2, 42) includes a strip of homogeneous (non-layered) plastic material having one or both of the following cleaning attributes: a matte finish (8) with a particular surface roughness and a series of transverse and longitudinal grooves (12, 14) of a chosen size. The average surface roughness of the matte finish and the size of the grooves are choosen to both remove contaminants and hold the removed contaminants on the cleaning surface. The head cleaner cleans magnetic heads well without the problems associated with layered cleaning tapes, including the high abrasive qualities of magnetic coatings or the drawbacks found with fabric type cleaning tapes. The cleaner can be used wet or dry, that is with or without a cleaning liquid (30).

31 Claims, 1 Drawing Sheet

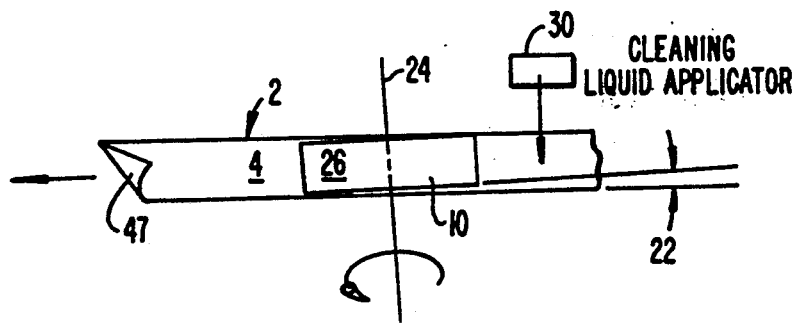
FIG._2.
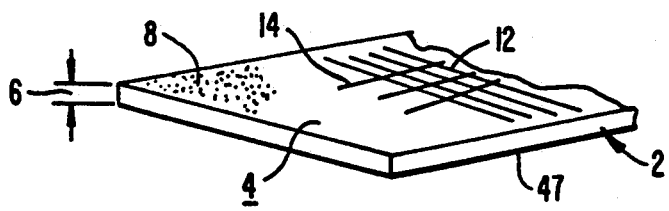
FIG._1.
FIG._4A.
FIG._4B.
FIG._4C.
FIG._4D.
FIG._4E.
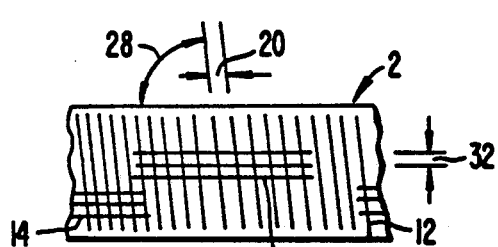
FIG._3.
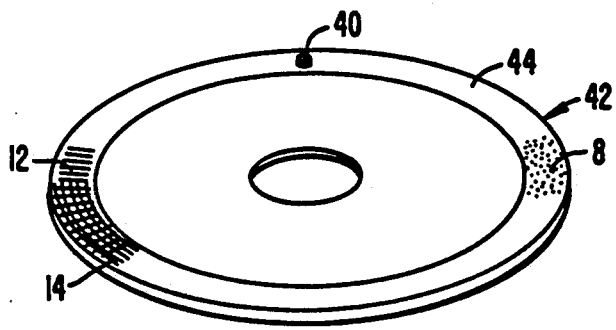
FIG._5.
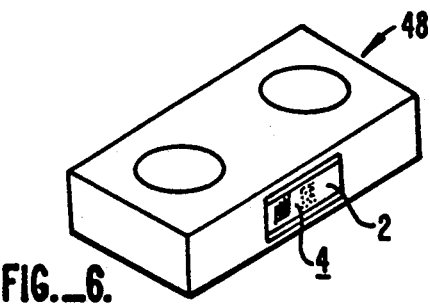
FIG._6.

HOMOGENEOUS MAGNETIC HEAD CLEANING MATERIAL

This is a continuation of Ser. No. 182,829, filed Apr. 18, 1988, now abandoned.

BACKGROUND OF THE INVENTION

This invention relates to material used to clean magnetic heads used in video cassette recorders and players (collectively VCR's). audio tape equipment, computer floppy disk drives and other similar equipment.

Magnetic heads must operate under quite adverse conditions. Some equipment, such as audio tape decks, have stationary magnetic heads so the tape rubs against the stationary magnetic head surface. Other equipment, such as VCR's, have a rotating magnetic head so both the tape and the head move. Although the tape and the rotating surface move in the same direction, the surface speed of the magnetic head of the VCR is much greater than that of the tape so the tape and the magnetic head still rub against one another. The magnetic heads of computer floppy disk drives are positioned along a radial path while the floppy disk rotates at a high rate of speed immediately below or above it.

Magnetic heads become contaminated with the abrasive magnetic coating within a binder carried by the substrate. The substrate is commonly a plastic film in a video or audio tape, or a plastic disk in floppy disk. One way to remove the contaminants is with a cleaning tape or disk having a much more highly abrasive surface than that found on a conventional tape or floppy disk. One such cleaning tape includes a carrier film with a magnetic iron oxide bound to its surface for cleaning magnetic heads. One drawback with this type of layered cleaning tape is that being highly abrasive, it is harmful to the magnetic head it is cleaning. Also, cleaning tapes having an abrasive magnetic coating bound to a carrier film have not been found suitable for use with cleaning liquids so that cleaning using such tapes must be done dry.

Another conventional method of cleaning magnetic heads is to use a sheet of fibrous material bonded to an opaque film substrate with the cleaning occurring on the fiber side. Although this type of magnetic head cleaning tape is far less abrasive than the above discussed abrasive cleaning tapes, it also suffers from several disadvantages. Since it is a layered, as opposed to homogeneous, structure, lamination problems can exist. Using a fibrous material, special attention must be paid to the edges of the tape to insure that the edges are clean and free of stray fibers.

A third type of cleaning tape uses a strip of fabric, such as a nylon, to clean the magnetic heads and drive components. When used with a VCR. the cassette having the fabric cleaning tape is modified so that the VCR is never given an end-of-tape signal by blocking the light path which extends through a conventional cassette. (This is not required with the above two conventional cleaning tapes since they are sufficiently opaque.) This type not only suffers from the problems associated with stray fibers, the user is required to stop th VCR before the end of the cleaning tape is reached since the VCR will not recognize it.

SUMMARY OF THE INVENTION

The present invention is directed to a magnetic head cleaning material and method which uses a strip of homogeneous polymeric material having one or both of the following cleaning attributes a cleaning surface having a matte finish with an appropriate roughness and a cleaning surface with transverse grooves.

It has been found that a plastic film having matte surface with on average roughness of about 0.5 $\mu$m does a good job of cleaning magnetic heads. The preferred range of roughness is about 0.1 $\mu$m to about 1.0 $\mu$m. This cleaning effectiveness is achieved without the harmful abrasive qualities of magnetic coatings or the drawbacks found with fabric type cleaning tapes. The matte surface can be created by embossing the surface of a polymeric film to the desired surface character. It can also be achieved using a polymeric film incorporating a filler, such as silicon dioxide. Polymeric films with matte finishes created by embossing techniques are considered mildly-abrasive since they do not contain hard exposed particles as do cleaning tapes with a layer of magnetic iron oxide bound to its surface. Incorporation of particles into the polymeric material produces a homogenous material in which the particles at the surface of the material (which do the cleaning) are not exposed but rather are encapsulated by a layer of the polymeric material. Although the abrasiveness can be controlled by selection of the particle type (e.g., hard or soft). size and amount, due to the encapsulation in the polymeric material (as opposed to layered and exposed iron oxide particles) the material can remain mildly abrasive regardless of the hardness of the particles. Matte finish polymeric films incorporating fillers of magnetic or non-magnetic material can be effective even though only mildly abrasive.

The transverse groove cleaning attribute is created by forming, typically by embossing, transversely oriented grooves in the cleaning surface of the cleaning tape. The transverse grooves can be of different cross-sectional shapes and are preferably about 1-5 $\mu$m deep and about 2-10 $\mu$m wide with a groove to groove spacing of about 5-20 $\mu$m. Sets of parallel grooves oriented generally perpendicular to the direction of movement of the tape provide the desired mechanical cleaning properties necessary to remove contaminants from the recording head. Since no abrasive particles need be used, such films are considered non-abrasive. Longitudinal grooves can also be used and are especially useful when a cleaning liquid is applied to the cleaning surface of the cleaning tape. The grooves facilitate movement of the cleaning liquid by capillary action, acting somewhat like canals on the tape surface, to distribute the cleaning liquid over the tape surface.

The cleaning tape can incorporate one or both of the cleaning attributes. The cleaning tape, unlike conventional tapes using an abrasive magnetic coating, can be used wet or dry, that is with or without a cleaning liquid.

With the invention the contaminants removed from the magnetic head (as well as other transport components) are effectively held by the cleaning material. Both the matte finish and the grooved finish hold the removed contaminants much better than conventional cleaning tapes having a bonded iron oxide layer.

The invention preferably exhibits only mild abrasiveness. It is possible that under some circumstances a harsher abrasiveness is desired. The invention including the homogenous polymeric material with a matte finish could be made to exhibit such high abrasiveness, such as by chemically removing the layer of polymeric material from the surfaces of the particles or by using hard, large particles within a polymeric material which tends to rub off the particle surfaces so to expose the particles.

Based upon the choice of the polymeric material, the resulting tape may or may not be sufficiently opaque for use in a conventional VCR cassette. If not, it may be desired to apply a thin layer of carbon to the back side of the tape (the side not rubbing against to magnetic heads). The thin carbon film has been found effective to make the tape sufficiently opaque while not materially affecting the cleaning effectiveness of the back side of the tape as it passes various transport components.

Another advantage of the invention is that it eliminates some of the problems associated with prior art multi-layered and fabric cleaning media. The abrasive effects on the magnetic head can be minimized by not requiring the use of highly abrasive magnetic coatings. Delaminations, fabric fiber contamination and other problems associated with multilayered and fabric (as opposed to homogeneous polymeric) cleaning media are eliminated. Also, the cleaning attributes can be used alone or combined and can be used with or without cleaning liquid as the circumstances dictate. This provides a great amount of flexibility to the designer according to the particular type of magnetic head being cleaned and the environment the magnetic head is subjected to.

Other features and advantages of the invention will appear from the following description in which the preferred embodiments have been set forth in detail in conjunction with the accompanying drawing.

BRIEF DESCRIPTION OF THE DRAWING

FIG. 1 is a simplified isometric view showing a strip of cleaning tape incorporating the matte finish and groove cleaning attributes.

FIG. 2 is a simplified schematic view showing the orientations and directions of movement of a VCR magnetic head, a cleaning tape and a cleaning liquid applicator.

FIG. 3 illustrates the orientations of the transverse and longitudinal grooves in the cleaning tape of FIG. 1.

FIGS. 4A-4E five different cleaning tapes of FIG. 3 with different cross-sectional shapes.

FIG. 5 illustrates the strip of cleaning material as a part of a floppy disk, the cleaning strip in the form of a ring rather than an elongate strip as in the embodiment of FIG. 1.

FIG. 6 is an isometric view of a VCR cleaning cartridge using the tape of FIG. 1.

DETAILED DESCRIPTION OF THE PREFERRED EMBODIMENTS

FIG. 1 shows a portion of a cleaning tape 2 having a cleaning surface 4. The thickness 6 of tape 2 is exaggerated for purposes of illustration. Tape 2 is a homogeneous polymeric material, that is not layered, and includes two cleaning attributes. The first cleaning attribute is the provision of a matte finish 8 on cleaning surface 4. For the second cleaning attribute cleaning surface 4 includes a set of transverse grooves 12 (which do the cleaning) and, optionally, longitudinal grooves 14 (which help distribute a cleaning liquid which it is used on surface 4). These grooves are also illustrated in FIG. 3. Matte finish 8 is not shown in FIG. 3 for clarity of illustration of grooves 12, 14.

Matte finish 8 preferably has an average (rms) roughness of about 0.1-1.0 $\mu$m and preferably about 0.5 $\mu$m. This surface texture has proven to be effective in cleaning magnetic heads, such as VCR magnetic head 10 illustrated in FIG. 2. The film sold by ICI Americas Inc. of Wilmington. Delaware as MELINEX 377/75 or 378/75 has the desired surface texture to provide an effective cleaning surface without the drawbacks of conventional cleaning tape. This film has non-magnetic (silicate) filler. The amount and particle size of the filler 4 provides the desired matte finish to provide effective cleaning without excessive abrasiveness.

Transverse grooves 12 are deep enough so to provide an interrupted cleaning surface 4 so to remove contaminates from magnetic head 10. In one embodiment used with a VCR magnetic head, transverse grooves 12 have a longitudinal spacing 20 of about 5-20 $\mu$m. a width of about 2-10 $\mu$, and a depth of about 1-5 $\mu$m. Various cross-sectional configurations of grooves 12a-12e which may be useful are illustrated in FIGS. 4A-4E. For many applications transverse grooves 12 will be perpendicular to the longitudinal axis of tape 2. However, as shown in FIG. 2. VCR magnetic heads are typically oriented at a slight angle 22 relative to tape 2. In conventional VCR machines this is about 7°. Accordingly, transverse grooves 12, to be oriented parallel to the axis 24 of magnetic head 10 and thus perpendicular to the relative direction of movement between surface 26 of magnetic head 10 and cleaning surface 4 of tape 2, are oriented at an angle 28 to the longitudinal axis of cleaning tape 2, angle 28 being the complement of angle 22, typically about 83°.

Longitudinal grooves 14 are parallel to longitudinal axis of cleaning tape 2 and are primarily useful for distributing any liquid cleaner which may be on cleaning surface 4 of tape 2. It is expected that grooves 14, as shown in FIG. 3, will not be continuous along the length of tape 2. The cleaning liquid, if used, can be applied by a cleaning liquid applicator 30. A transverse spacing 32 of about 5-20 $\mu$m for a cleaning tape 2 used with VCR's is preferred. Longitudinal grooves 14 do not have to be the same depth as transverse grooves 12 since they provide very little cleaning action. A depth of 1-5 $\mu$m and a width of 2-10 $\mu$m for longitudinal grooves 14 is preferred for cleaning tape 2 when used to clean a VCR magnetic head 10.

The invention can also be used to clean the magnetic head 40 of a computer disk drive, not shown, using a cleaning floppy disk 42 as shown in FIG. 5. In the embodiment of FIG. 5 a circular, as opposed to a straight, cleaning strip 44 is incorporated as an integral part of cleaning floppy disk 42. That is, cleaning strip 44 is a homogeneous material throughout its thickness, which has been exaggerated in FIG. 5 for purposes of illustration. Except for the circular nature of cleaning strip 44, the cleaning strip is substantially identical to cleaning tape 2 of FIG. 1 and has like elements identified with like reference numerals.

Tapes used with VCR's contain clear leaders at each end. The sensing of a clear leader indicates the end of the tape, which causes the tape to rewind and then stop once rewound. A thin layer of light absorbing material 38, typically carbon, is applied to a back surface 47 of tape 2 to make cleaning tape 2 sufficiently opaque so that when used with a VCR. the VCR does not mistake cleaning tape 2 for the clear leader at the ends of a conventional VCR tape. Of course tape 2 may be used with its own clear leaders and would need no layer 38 if by itself it were sufficiently opaque.

In use, assuming use with a VCR, cleaning tape 2 is mounted within a conventional VCR tape cartridge 48, shown in FIG. 6, with cleaning surface 4 oriented so to contact VCR magnetic head 10. The VCR (not shown) is then placed in the play mode allowing cleaning surface 4 to rub or wipe across surface 26 of magnetic head 10. Contaminants on surface 26 are loosened and collected by virtue of matte finish 8 and transverse grooves 12 so that contaminants are transferred from surface 26 to surface 4. Liquid cleaner from applicator 30, incorporated as part of cartridge 48, also helps the loosening and removal of contaminants. After a length of cleaning tape has been "played". the VCR is stopped, cleaning tape cartridge 48 is removed and a prerecorded tape cartridge is played on the VCR to check the cleaning effectiveness. This is preferably accomplished using a test tape by which the user can check cleaning effectiveness and make picture quality and head alignment adjustments if necessary.

The invention has been described with reference to cleaning tape 2 including both cleaning attributes: the matte finish and the grooves. However, the invention can be practiced using only one of the cleaning attributes (or with additional cleaning attributes) as well.

In this application cleaning tape 2 has been identified as being a homogeneous polymeric material. This designation refers to materials which are not fabric based and those in which the cleaning surfaces are not layered as are prior art cleaning tapes, including both those with an abrasive magnetic coating as the cleaning face and those with a fiber or fabric layer as the cleaning face. Adding a thin carbon layer to the back side of the tape does not affect its being a homogenous polymeric material. Also, the word "strip" has been used to designate a length of the material. As evident from FIG. 5, strip can also be other than straight, such as an annular region on a floppy disk.

Other modification and variation can be made to the disclosed embodiments without departing from the subject of the invention as defined in the following claims.

What is claimed:

1. A magnetic head cleaner, for removing contaminant from a magnetic head, comprising:
    a strip of homogeneous polymeric material having a length, a cleaning surface and at least one of the following cleaning attributes:
    (a) the cleaning surface having a matte finish with an average roughness of about 0.1 μm to about 1.0 μm; and
    (b) the cleaning surface having grooves formed therein transverse to the length.

2. The cleaner of claim 1 wherein the transverse grooves are about 1–5 μm deep and about 2–10 μm wide.

3. The cleaner of claim 2 wherein the transverse grooves have a longitudinal spacing of about 5–20 μm.

4. The cleaner of claim 1 further comprising a cleaning liquid on the cleaning surface.

5. The cleaner of claim 4 wherein the cleaner includes said transverse grooves and further comprises longitudinal grooves sized to enhance movement of the cleaning liquid over the cleaning surface by capillary action.

6. The cleaner of claim 1 wherein the strip of material is a length of film for cleaning a VCR, the film housing a head cleaning side and a back side, the back side housing a layer of carbon deposited thereon to make the film generally opaque.

7. The cleaner of claim 1 wherein the matte finish and transverse grooves are sized to retain the contaminant removed from the magnetic head on the cleaning surface.

8. The cleaner of claim 1 wherein the strip of material has solid particles encapsulated therein which provide the matte finish surface.

9. A magnetic head cleaner comprising:
    a strip of polymeric material having first and second surfaces and a thickness therebetween, an unvarying composition throughout the thickness, and a matte finish formed in the first surface with a roughness of about 0.1–1.0 μm.

10. The cleaner of claim 9 wherein the strip of material includes solid particles encapsulated therein which uniformly throughout the thickness provide the matte finish surface.

11. The cleaner of claim 10 further comprising a cleaning liquid on the matte finish surface.

12. The cleaner of claim 9 wherein the material includes one matte finish surface.

13. A magnetic head cleaner comprising:
    a strip of homogeneous polymeric non-fibrous film having a length and first and second surfaces; and
    said first surface including grooved areas formed in the first surface and oriented transversely to the length.

14. The cleaner of claim 13 wherein the grooved areas are arranged as straight, parallel lines, 15. A method for cleaning a magnetic head comprising the following steps:
    selecting a strip of homogeneous polymeric material having a length and at least one of the following cleaning attributes:
    (a) the cleaning surface having a matte finish with a roughness of about 0.1–1.0 μm; and
    (b) the cleaning surface having grooves formed transversely to the length, the grooves being about 1–5 μm deep and about 2–10 μm wide; and
    rubbing the cleaning surface of the strip of material and the magnetic heads so that contaminants on the magnetic head are transferred to the cleaning surface.

16. A magnetic head cleaner comprising:
    a strip of homogeneous polymer material having first and second surfaces; and
    said first surface including transversely oriented grooved areas, the grooved areas being about 1–5 μm deep and about 2–10 μm wide.

17. The cleaner of claim 16 wherein the grooved areas have a longitudinal spacing of about 5–20 μm.

18. The cleaner of claim 17 wherein the transverse grooved area sized to retain on the cleaning surface contaminants removed from the magnetic head.

19. The cleaner of claim 18 further comprising a cleaning liquid on the first surface.

20. The cleaner of claim 19 further comprising longitudinal grooves formed in the first surface sized to enhance movement of the cleaning liquid over the cleaning surface by capillary action.

21. The cleaner of claim 20 wherein the strip of material has an opaque layer of carbon on the second surface.

22. A method for cleaning a magnetic head comprising the following steps:
    selecting a strip of polymeric material having a first, cleaning surface, with a matte finish formed in the cleaning surface with a roughness of about 0.1–1.0 μm, a second surface, and a thickness between the first and second surfaces with an unvarying composition throughout the thickness; and rubbing the cleaning surface of the strip of material against the magnetic head so that contaminants on the magnetic head are transferred to the cleaning surface.

23. The method of claim 22 wherein the rubbing step is carried out using the magnetic head of a video cassette machine.

24. The method of claim 22 further comprising the step of applying a cleaning liquid to the cleaning surface before the rubbing step.

25. The method of claim 22 wherein the rubbing step is carried out by moving both the strip of material and the magnetic head.

26. A method for cleaning a magnetic head comprising the following steps:

selecting a strip of homogeneous polymeric material having a length and a cleaning surface with grooves about 1-5 μm deep and about 2-10 μm wide oriented transversely to the length; and rubbing the cleaning surface against the magnetic head so that contaminants on the magnetic head are transferred to the cleaning surface by the action of the grooves passing over the magnetic head.

27. The method of claim 26 further comprising the step of applying a liquid cleaner to the cleaning surface before the rubbing step.

28. A magnetic head cleaner for cleaning the circumference of a rotating magnetic head as the rotating magnetic head rotates about an axis, the rotating magnetic head having an axis oriented at an acute angle to the direction of movement of the passing magnetic tape, the cleaner comprising:

a strip of homogeneous polymeric material having a length and a cleaning surface; and the cleaning surface including grooved areas oriented parallel to the axis of the rotating magnetic head and at the acute angle to the length of the strip.

29. The cleaner of claim 28 wherein the cleaning surface has a matte finish with a roughness of about 0.1-1.0 μm.

30. The cleaner of claim 28 wherein the grooved areas are about 1-5 μm deep and about 2-10 μ wide.

31. The cleaner of claim 29 wherein the grooved areas are about 1-5 μm deep and about 2-10 μ wide.

* * * * *

UNITED STATES PATENT AND TRADEMARK OFFICE
CERTIFICATE OF CORRECTION

PATENT NO. : 5,012,377
DATED : April 30, 1991
INVENTOR(S) : Mohammed Siddiq and I-Huan Lo It is certified that error appears in the above-identified patent and that said Letters Patent is hereby corrected as shown below:

On the title page, under item [19] and in item [75]:

Delete "Siddio et al." and "Mohammed Siddio" and substitute therefor, respectively, --Siddiq et al. -- and --Mohammed Siddiq--.

Signed and Sealed this

Twentieth Day of October, 1992

Attest:

DOUGLAS B. COMER

*Attesting Officer*  *Acting Commissioner of Patents and Trademarks*